United States Patent [19]

Stovall

[11] 3,939,719
[45] Feb. 24, 1976

[54] AN IMPROVED POWER CONVERTER APPARATUS
[76] Inventor: William R. Stovall, Rte. 2, Box 30, Stuart, Okla. 74570
[22] Filed: Nov. 15, 1973
[21] Appl. No.: 416,196

[52] U.S. Cl.................................. 74/128; 74/130
[51] Int. Cl.².................................. F16H 27/02
[58] Field of Search......... 74/34, 29, 143, 126, 128, 74/130, 142; 280/252, 254, 243, 245

[56] References Cited
UNITED STATES PATENTS

| | | | |
|---|---|---|---|
| 1,014,706 | 1/1912 | Houghton | 74/34 |
| 1,233,920 | 7/1917 | Rolfe | 74/34 |

Primary Examiner—Samuel Scott
Assistant Examiner—Wesley S. Ratliff, Jr.
Attorney, Agent, or Firm—Dunlap and Codding

[57] ABSTRACT

An apparatus for converting the power of a reciprocating member to unidirectional rotation of an output shaft. A reciprocator is connected to a coupling shaft so as to rotate the coupling shaft in alternating directions. Gears and clutches driven by the coupling shaft convert the alternating movement of the coupling shaft to unidirectional rotation imparted to the output shaft. In other embodiments, the reciprocator drives coupling shafts which in turn impart alternating movement to clutch assemblies that cooperate to alternately impart unidirectional rotation to the output shaft.

9 Claims, 7 Drawing Figures

AN IMPROVED POWER CONVERTER APPARATUS

BACKGROUND OF THE INVENTION

1. Field of the Invention

This invention relates to an apparatus for converting the power of a reciprocating member to a unidirectional rotational motion for use as a power source.

2. Description of the Prior Art

Prior art devices have for the most part involved the conversion of transitory movement into intermittent and usually oscillating, rotational movement, and have not taught a reliable, unidirectional rotational movement of a shaft as driven by a reciprocating member. Some prior art mechanisms have used crank shafts to avoid direct conversion from a reciprocating power source, an example of which is the conventional internal combustion engine where reciprocating pistons are linked to a cam shaft to achieve rotational output.

One method of achieving rotational movement of a shaft by the use of a reciprocating source is where a cable is wrapped around a series of arbors, in the manner of warping, to convert reciprocating movement to rotational torque. In this process, a cable wrapped about a capstan or a windless transmits rotational movement by a linear displacement of the cable. Although this type of linkage demonstrates the principle of converting reciprocating movement to rotational movement, it finds limited use because of the inherent limitations of large frictional losses and arbor wear. It also introduces the variables of arbor inertia and surface smoothness. However, mechanisms using this principle have found utility in low torque devices, such as in early sewing machines and toys. Such prior art teachings relating to conversion of reciprocating motion are generally limited to those uses requiring low torque and low rotational speed.

There is a need for an apparatus that will convert reciprocating movement to rotational movement efficiently at rotational speeds that can be utilized in high torque, high speed applications. Such an apparatus must be reliable and continuous, and it must be capable of precision control. Many advantages that are to be gained from such an apparatus include savings in space brought about by the compactness of the power plant. Another advantage would be that the manufacture of expensive, precision-balanced crank shafts could be eliminated, thereby making less expensive power transfer available. An apparatus using such a power plant would find many uses at the interfaces of reciprocating power plants that drive mechanisms requiring rotational input.

One of the advantages that an apparatus such as is taught in the present invention is the achievement of constant torque for a given pressure of force of application, something that is not achieved by any other power converter. For example, on a piston drive crank shaft, the torque varies cyclically as the shaft is turned. Aside from the fact that pressure varies, the force on the crank shaft is met with varying movement effect as the crank shaft rotates. This can be avoided by a direct conversion of reciprocating power to rotational power.

A use envisioned for an apparatus converting reciprocating movement to rotational movement is in the propulsion of vehicles, as for example, in the propulsion of cycles. Prior art devices have dealt with this problem, but suggested designs have been usable as toys. The present invention discloses a precision, high quality cycle power plant, one capable of competing with modern cycle technology. An efficient cycle propelled by human effort is finding increasing need in this country as we face increasing energy conservation and pollution problems.

SUMMARY OF INVENTION

It is an object of the present invention to provide an apparatus that will create a rotary force at an equal and constant torque from an application of straight line force without regard to the position, timing or direction of the straight line force.

Another object of the present invention to provide an apparatus that will convert reciprocating movement to a rotational movement substantially continuously at relatively high rates of speed.

Another object of the present invention is to provide an improved apparatus for the conversion of reciprocating movement to rotational movement with a substantially reduced loss of energy due to friction and inertia.

Yet another object of the present invention is to provide a strong and reliable apparatus for the conversion of reciprocating movement to rotational movement which is economical in the construction and the operation thereof.

Other objects and advantages will become apparent to the persons skilled in the art in view of the following specification and in light of the accompanying drawings which are a part hereof.

DESCRIPTION OF THE EMBODIMENT OF FIGURES 1 AND 2

Figure 1:
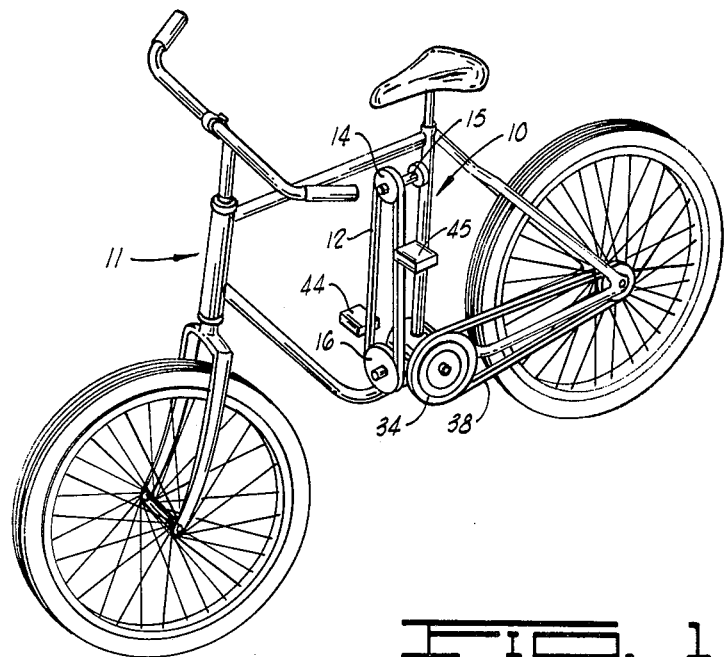
FIG. 1 is a partial perspective, partial diagrammatical view of a bicycle driven by a reciprocator drive apparatus of the present invention.

Referring to the drawings and particularly to FIG. 1, the reciprocator drive apparatus of the present invention is illustrated and generally designated by the numeral 10 as it might appear as a part of a conventional bicycle 11. The reciprocator drive apparatus 10, as shown more clearly in FIG. 2, comprises: an endless chain 12 that encircles a sprocket 14, the sprocket 14 being bearingly supported on shaft 15, which is connected to bicycle 11; and a sprocket 16. The sprocket 16 is connected to a coupling shaft 18 and the coupling shaft is connected to a clutch assembly 20. The clutch assembly 20 includes a beveled type of drive gear 22, a pair of beveled type of driven gears 24 and 26, and a pair of ratchet clutches 28 and 30. The driven gears 24 and 26 are connected to the ratchet clutches 28 and 30, respectively, and the ratchet clutches 28 and 30 are connected to the output shaft 32, which is shown in the partial cutaway view through the drive gear 22 in FIG. 2. As will be understood by a person having ordinary skill in the art, the construction of each of the driven gears 24 and 26 with its respective clutch 24, 30 is such that rotation in one direction only will impart driving movement to output shaft 32. That is, the driven gears 24 and 26 are gearingly meshed with drive gear 22, such that rotation of drive gear 22 causes the rotation of the driven gears 24, 26, in opposite rotational directions. When gear 24 is rotated in one direction, its connected clutch 28 grips and thereby imparts driving rotation to output shaft 32. On the other hand, when gear 24 is rotated in the opposite direction, the driven gear 24 is caused to slip by its clutch 28 and thereby turns freely, the consequency of which is that driven gear 24 is then free turning in that direction and does not impart rotational driving motion to output shaft 32. The driven gear 26 and its ratchet clutch 30 are similarly constructed but are designed and arranged so that the rotation of driven gear 26 is free turning in the direction of rotation in which driven gear 24 imparts driving motion to the output shaft 32, and conversely, driven gear 26 is caused to drive output shaft 32 via clutch 30 in the direction of rotation in which driven gear 26 is free wheeling. Thus, when ratchet clutch 28 is gripping the output shaft 32, the ratchet clutch 30 is free turning, and the reverse is true. The purpose of this will be made clear below. The result of this arrangement of driven gears 24, 26 and ratchet clutches 28, 30 as gearingly driven by drive gear 22 is that the output shaft 32 is caused to rotate in a predetermined unidirectional rotation with the rotation of coupling shaft 18, regardless of which rotational direction that coupling shaft 18 is caused to rotate. In other words, when the coupling shaft 18 is placed in a rotational position or mode, the output shaft 32 is placed in a position of unidirectional rotation. Of course, the direction of rotation that output shaft 32 assumes in this position is determined by the arrangement of the gripping and free wheeling characteristics of the ratchet clutches 28, 30.

The output shaft 32 is connected to sprocket 34, which in turn is drivingly connected to sprocket 36 via an endless chain 38. The sprocket 36 is connected to shaft 40 which is drivingly connected to wheel 42.

Figure 2:
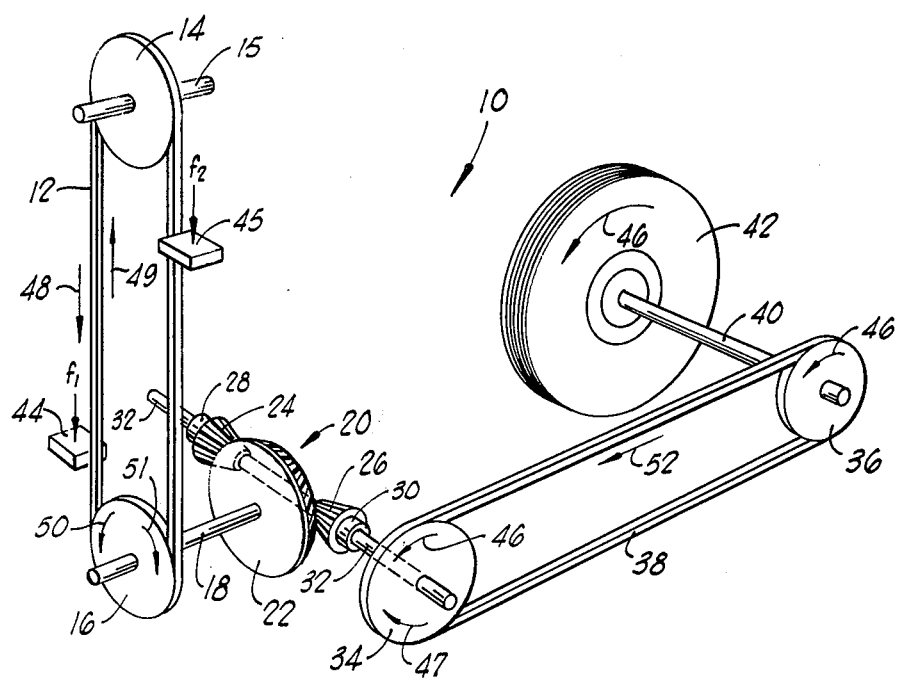
FIG. 2 is an enlarged, diagrammatical view of the reciprocator drive apparatus of FIG. 1.

Attached to chain 12 is a pair of reciprocators 44 and 45. Of course, only one such reciprocator could be connected to the chain 12 and the result would be entirely satisfactory. But as will be clear presently, by utilizing a pair of such reciprocators spaced as shown in FIG. 2, force may be applied from a single direction and on one reciprocator at a time as is common on a foot driven cycle as shown at 11 in FIG. 1. The reciprocators 44, 45 could be handles or pedals dependent upon the application of the device. As shown utilized in the application as a power source for a cycle, it is convenient to show the reciprocators 44, 45 as foot pedals. It will also become clear below that these could be operated manually or power driven.

The structure of clutch assembly 20 can best be understood in light of its purpose; that of converting the rotational movement of coupling shaft 18 to a continuous rotational output of the output shaft 32 in a predetermined rotational direction. When sprocket 16 is rotated so that it imparts rotation to coupling shaft 18 and consequently the same rotation to drive gear 22 in a direction that imparts rotation to driven gear 24 in a direction 46, the ratchet clutch 28 grips and rotates output shaft 32. The direction 46 is shown by the arrow indicating the rotational direction of sprocket 34 in FIG. 2. This is an arbitrary arrangement of ratchet clutch 28 for purposes of discussion herein, and this scheme will be carried forward to indicate that at the same time that ratchet clutch 28 is in gripping relationship to output shaft 32, drive gear 22 is causing driven gear 26 to rotate in the direction 47 which is opposite in rotational direction to direction 46, as indicated by the arrow of direction on sprocket 34 in FIG. 2. In the position of direction 47, the ratchet clutch 30 is free turning and does not impart any effect upon output shaft 32. On the other hand, when drive gear 22 rotates in the direction that causes driven gear 24 to rotate in the direction 47, the ratchet clutch 28 is free turning, and simultaneously driven gear 26 is rotated by the drive gear 22 in the direction 46. When driven gear 26 is turned in direction 46, ratchet clutch 30 grips and imparts rotation to output shaft 32. To make this clear, it will be understood below that drive gear 22 will alternately turn in a first direction and then in a second direction that is opposite to the first direction. This alternating rotational movement of drive gear 22 will cause driven gears 24, 26 to also rotate but in opposite directions relative to each other. Because of the gripping relationship of ratchet clutches 28, 30, it will be understood that driving movement will be imparted to output shaft 32 only when each of the ratchet clutches' respective gear is turning in the rotational direction 46. Since this is performed alternately, that is, it is not performed at the same time by each of the driven gears 24 and 26, it will be understood that driving force will be imparted to the output shaft 32 at all times that the drive gear 22 is in a moving position.

For purposes of illustration and discussion, the ratchet clutches 28 and 30 have been hereinabove assigned arbitrary gripping and rotational relationships, but it will be understood that the ratchet clutches 28 and 30 can be so designed and arranged as to grip and release in a manner that is opposite to that which has been discussed. The important thing to bear in mind for this disclosure is that one of the ratchet clutches grips and causes rotational output to the output shaft 32 via a driving position while the other ratchet clutch is free turning, and the reverse relationship is achieved when the rotations are reversed. The result of this is to cause continuous rotation of the output shaft 32 regardless of direction of rotation of the drive gear 22.

Operation of the Embodiment of Figures 1 and 2

In operation of the embodiment shown in FIGS. 1 and 2, a force parallel to the chain 12 is applied to each of the reciprocators 44 and 45 in the manner as will be now described. These forces are depicted as $f_1$ as applied to reciprocator 44 and $f_2$ as applied to reciprocator 45. In order to cause reciprocators 44 and 45 to reciprocate, it will be necessary to apply force $f_1$ and $f_2$ intermittently and consecutively so that while $f_1$ is applied, $f_2$ is relaxed, and while $f_2$ is applied, $f_1$ is relaxed. This will be recognized, of course, as nothing more than the action of the application of pushing by the operator of bicycle 11 such that the operator first pushes reciprocator 44 down while allowing reciprocator 45 to rise, and then pushes reciprocator 45 down while allowing reciprocator 44 to rise. Of course, forces $f_1$ and $f_2$ are transmitted via chain 12 alternately to each side of reciprocators 44 and 45. It will be understood that a single reciprocator could be used, thereupon necessitating the pulling of the reciprocator up once it has traveled downward.

The forces $f_1$ and $f_2$ applied as described cause chain 12 to move first in direction 48 and then in direction 49. This movement is transmitted to sprocket 16 causing it to rotate about its center, alternately in directions 50 and 51. This rotational movement of sprocket 16 in alternating directions is transmitted through the coupling shaft 18 to drive gear 22 in precisely the same alternating rotational movement. This movement of gear 22 is imparted to driven gears 24 and 26, in turn causing the ratchet clutches 28 and 30 to alternately rotate in the directions 46 and 47. That is, when chain 12 moves in direction 48, the sprocket 16, coupling shaft 18, and gear 22 rotate in direction 50, driven gear 24 and ratchet clutch 28 rotate in the direction 46, and driven gear 26 and ratchet clutch 30 rotate in the direction 47. Since the ratchet clutch 28, when moved in the direction 46, grippingly rotates output shaft 32, the force $f_1$ that has caused chain 12 to move in direction 48 is transmitted via ratchet clutch 28 to rotate output shaft 32 in direction 46. Ratchet clutch 30, when turning in the direction 47, as is the case at this point, is free turning and imparts no driving force to output shaft 32.

When chain 12 is moved by the application of force $f_2$ in the direction 49, sprocket 16 is made to move in direction 51. This action upon sprocket 16 through coupling shaft 18 rotates drive gear 22 in direction 51, causing the rotation of driven gear 24 and ratchet clutch 28 in direction 47, while driven gear 26 and ratchet clutch 30 are caused to rotate in the direction 46. Since ratchet clutch 28, when rotated in the direction 47 is free turning, ratchet clutch 28 does not impart rotational movement to output shaft 32 in this rotational direction. Meanwhile, the rotation of ratchet clutch 30 in direction 46 causes ratchet clutch 30 to grippingly rotate the output shaft 32 in direction 46. Therefore, the application of force $f_2$ which has caused chain 12 to move in direction 49 is transmitted via the ratchet clutch 30 to cause the rotation of output shaft 32 in the continued direction 46.

Thus, it is seen that the movement of the chain in either direction 48 or 49 imparts rotational movement to the output shaft 32 in direction 46. Viewed from the perspective of the coupling shaft 18, it is evident that the output shaft 32 is unidirectionally rotated in a continuous manner so long as the coupling shaft 18 is in the position, or mode, of rotation. As will be apparent to one having ordinary skill in the art, the output shaft 32 can be made to rotate in the rotational direction 47 by reversing the action of the two ratchet clutches 28 and 30. That is, by arranging the ratchets to have gripping relationship to the output shaft 32 in the opposite rotational direction to that described above, the reciprocating movement of chain 12 will impart continuous rotational movement to output shaft 32 in the direction 47.

For continued discussion, it will be assumed that the output shaft 32 is rotating in direction 46. This rotation of output shaft 32 drives sprocket 34 in direction 46, causing chain 38 to move in the direction 52. This movement of chain 38 causes the sprocket 36 to rotate also in the direction 46, which in turn imparts the same rotational direction to shaft 40 and consequently to wheel 42. Thus, wheel 42, which can be a driving wheel of a vehicle, as shown in FIG. 1, is moved in a continuous direction 46 by the reciprocating movement of chain 12 which was reciprocated by the to and fro movement of reciprocators 44, 45 as caused by the application of forces $f_1$ and $f_2$ in the manner described above.

As indicated above, if the reciprocators 44 and 45 are pedals manipulated by the action of the legs of a rider of cycle 11, the alternating movement of the pedals will cause the vehicle, driven by wheel 42, to be propelled. By selecting the operating mode of ratchet clutches 28 and 30, that is, the direction in which these ratchet clutches have gripping relationship to the output shaft 32, the wheel 42 can be made to turn in either direction 46 or 47, representing forward and reverse rotation of the wheel 42.

Of course, the gripping relationship of the ratchet clutches 28 and 30 to output shaft 32 can be established so as to be changeable by mechanical or electrical selection.

Figure 3:
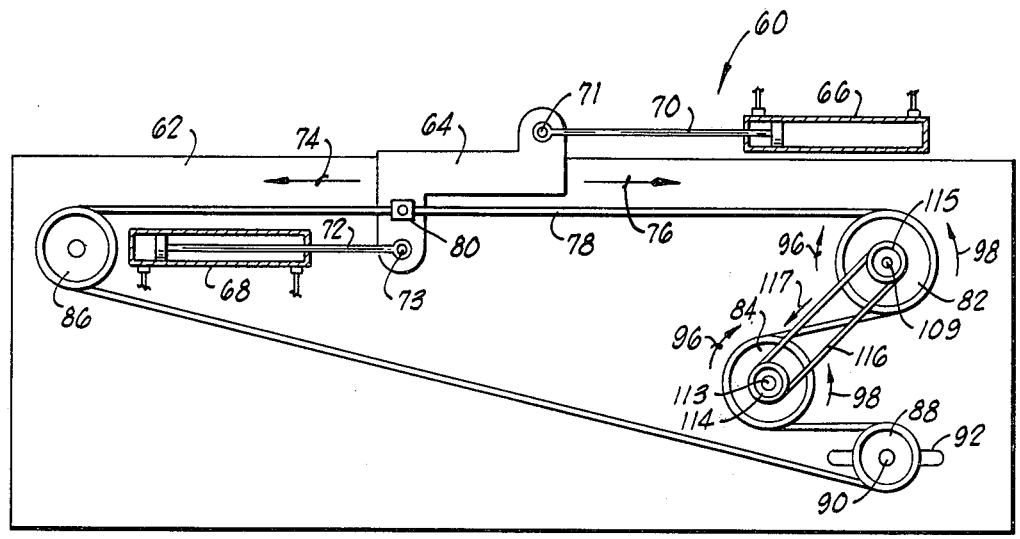
FIG. 3 is a diagrammatical, partial side elevational, partial sectional view of a modified reciprocator drive apparatus.
Figures 4, 5:
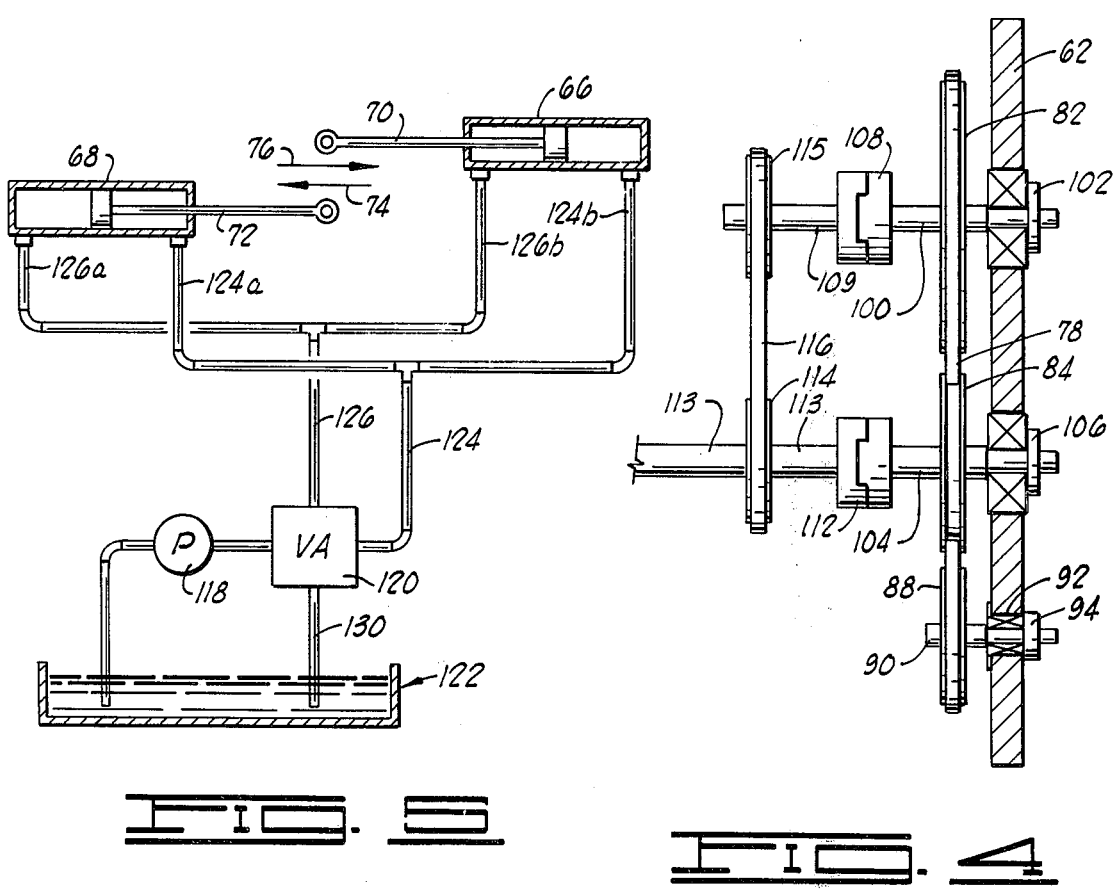
FIG. 4 is an enlarged, partial elevational, partial sectional view showing a portion of the modified reciprocator drive apparatus of FIG. 3.
FIG. 5 is a schematic of the drive control assembly of the modified reciprocator drive apparatus of FIG. 3.

Description of the Embodiments of Figures 3 and 4

Another embodiment of the present invention is illustrated in FIG. 3 and is generally designated by the numeral 60. The reciprocator drive apparatus 60 comprises the frame 62 which slidingly reciprocator 64. It is sufficient for purposes of this disclosure to state that reciprocator 64 is slidingly connected to frame 62, and that this can be achieved by conventional structure. Reciprocator 64 is connected to double-acting hydraulic cylinders 66 and 68, which include piston shafts 70 and 72, respectively. Piston shaft 70 is connected to one side of reciprocator 64 at point 71, and piston shaft 72 is connected to the opposite side of reciprocator 64 at point 73. As will be understood, piston shafts 70 and 72 are attached to their respective pistons in hydraulic cylinders 66 and 68.

Reciprocator 64 slides on frame 62 alternately in the linear direction 74 and in the linear direction 76, and chain 78 is connected at each of its ends to reciprocator 64 at the connection 80. Chain 78 encircles and gearingly drives sprockets 82 and 84, the support sprocket 86, and the adjust sprocket 88, all of which are rotatably journaled to frame 62.

Adjust sprocket 88 moves about arbor 90 which passes through slot 92 and is secured thereat by threaded backup plate 94, as may be best seen in FIG. 4. Arbor 90 can be secured at any point along slot 92 and serves as an adjustment for proper tensioning of chain 78. Once chain 78 is placed over the several sprockets including the adjust sprocket 88, the sprocket 88 on arbor 90 is adjusted laterally and secured by tightening threaded backup plate 94.

It should be noted that the slot 92 has been conveniently shown in FIG. 3 as containing sprocket 88. This is for ease of illustration, and one having ordinary skill in the art will recognize that this adjustment slot may be as well placed so as to hold one of the drive sprocket, the advantage being for ease of chain and belt adjustment.

Support sprocket 86 is rotatably mounted in a fixed location on frame 62 in a position that supports the chain 78 in linear relationship to reciprocator 64.

Referring to FIG. 3, the chain 78 is drivingly engaged to drive sprockets 82 and 84 so as to rotate these sprockets simultaneously in opposite rotating directions. For example, when the reciprocator 64 moves in linear direction 76, drive sprocket 82 will be rotated in rotational direction 96 via the driving action of chain 78, while at the same time, drive sprocket 84 will be rotated in rotational direction 98. On the other hand, when the reciprocator 64 moves in linear direction 74, the drive sprocket 82 will be rotated in rotational direction 98, and drive sprocket 84 will be rotated in rotational direction 96. Drive sprocket 82 is connected to coupling shaft 100, as best seen in FIG. 4, and coupling shaft 100 is journaled in bearing 102 which is mounted on frame 62. In like manner, drive sprocket 84 is connected to coupling shaft 104 which is journaled in bearing 106, also mounted on frame 62.

Coupling shaft 100 is connected to clutch 108 which is in turn connected to output shaft 109. The function of clutch 108 is to cause output shaft 109 to rotate only when coupling shaft is rotated in a predetermined rotational direction. For purposes of this disclosure, this direction has been arbitrarily assigned as follows. Clutch 108 grippingly rotates output shaft 109 in rotational direction 98 when coupling shaft 100 is turned in direction 98 by drive sprocket 82. On the other hand, clutch 108 does not grip output shaft 109 when coupling shaft 100 is rotated in rotational direction 96, the opposite rotational direction.

In like manner, coupling shaft 104, attached to drive sprocket 84, is connected to clutch 112 which is also connected to output shaft 113. Clutch 112 is constructed so that output shaft 113 is rotated in rotational direction 98 when coupling shaft 104 is rotated in rotational direction 98 by the drive sprocket 84. Clutch 112 releases output shaft 113 when coupling shaft 104 is caused to rotate in rotational direction 96 by the action of drive sprocket 84.

To this point, it has been established that the rotation of either of the drive sprockets 82 or 84 in the angular direction 98 causes the output shafts 109, 113 to be rotated in the same rotational direction 98. It has also been established that by the manner in which chain 78 is connected about sprockets 82 and 84, as shown in FIG. 3, one of the sprockets, 82 or 84, will be moving in the direction 98 regardless of whether reciprocator 64 moves in linear direction 74 or in the opposite linear direction 76. Stated differently, the movement of reciprocator 64 alternately in direction 74 and 76 will result in one of the drive sprockets 82 and 84 being driven in rotational direction 98.

As shown in FIG. 4, the output shaft 113 is connected to pulley 114 and output shaft 109 is connected to pulley 115. Encircling and drivingly connected to pulleys 114 and 115 is belt 116. As will be made clear below, output shaft 113 will be caused to rotate continuously in rotational direction 98 by the cooperative action of drive sprockets 82, 84; clutches 108, 112; output shaft 109; pulleys 114, 115; and belt 116. It is recognized herein that the pulleys 114 and 115 can be connected by clutch bearings to their respective output shafts, but it is not necessary for the purpose of the discussion herein to detail such structure. It is also recognized that the utilization of pulleys and a belt in this application may result in slippage. If such slippage could not be avoided by proper belt and sheave selection, then sprockets and a chain would be necessary in lieu of the pulleys and belt shown in FIG. 3.

Referring now to FIG. 5, a schematic diagram for hydraulic cylinders 66 and 68 is shown. The pump 118 pressurizes four-way valve 120 by fluid drawn from reservoir 122. Valve 120 directs fluid pressure to fluid line 124 or to fluid line 126, depending upon the positioning of valve 120. Fluid line 124 is connected to cylinders 66 and 68 by lines 124a and 124b. Therefore, when fluid line 124 is pressured by the cooperative action of pump 118 and four-way valve 120, fluid lines 124, 124a and 124b pressurize the two hydraulic cylinders 66 and 68, driving piston shafts 70 and 72 in the direction of 74.

Fluid line 126 is also connected to cylinders 66 and 68, by its comprising lines 126a and 126b. Therefore, when fluid line 126 is pressurized by the cooperative efforts of pump 118 and four-way valve 120, fluid lines 126, 126a and 126b pressurize the two cylinders 66 and 68, driving piston shafts 70 and 72 in the direction 76, which is opposite to direction 74.

Therefore, piston shafts 70 and 72 can be made to reciprocate in unison by actuating valve 120 so as to alternately pressurize fluid lines 124 and 126. As the lines 124, 126 are alternately pressurized and relieved, relief line 130 serves in a conventional manner to relieve the pressure from the dormant fluid line.

It will be understood that valve 120 may be manually or mechanically actuated to achieve alternate pressurization of fluid lines 124 and 126.

Operation of FIGS. 3 through 5

In operation of the embodiment shown in FIGS. 3 through 5, hydraulic pump 118, drawing fluid from the reservoir 122, is caused to pressurize fluid lines 124 and 126 alternately by the manipulation of four-way valve 120 and by the cooperation of relief line 130. Fluid lines 124a, 124b and 126a, 126b, being alternately pressurized and relieved, transmit pressure to the cylinders 66 and 68, respectively, causing piston shafts 70 and 72 to move alternately in directions 74 and 76 so as to provide a reciprocating power source for the embodiment under discussion.

To this end, when four-way valve 120 is operated so as to pressurize fluid line 124, relief line 130 has fluid communication with line 126 in order to relieve line 126 of its pressure. The pressurization of fluid line 124 pressurizes lines 124a and 124b connected to double-acting hydraulic valves 66 and 68, causing piston shafts 70 and 72 to move linearly in the direction 74.

At or near the time that piston shafts 70 and 72 have moved full stroke in the direction 74, valve 120 is manipulated so that pump 118 has fluid communication with fluid line 126, and simultaneously the fluid pressure in lines 124, 124a, 124b is relieved by fluid communication with relief line 130. This pressurization of line 126, 126a, 126b serves to pressurize the opposite ends of hydraulic cylinders 66, 68 so that piston shafts 70 and 72 are now caused to reverse their direction and to move in the direction 76.

When piston shafts 70 and 72 have reached at or near full stroke in the direction 76, valve 120 again is reversed in the manner described above. This process is repeated at a determined frequency so that the alternate pressurization of the fluid lines leading to the double-acting hydraulic valves 66 and 68 causes the reciprocating movement of the piston shafts 70 and 72 in unison in the directions 74 and 76.

Shafts 70 and 72 are connected at points 71 and 73 respectively to opposite ends of the reciprocator 64. As can best be followed by viewing FIG. 3, the reciprocating movement of piston shafts 70 and 72, in the manner and for the reason discussed above, causes like reciprocating action of the reciprocator 64 alternately in the directions 74 and 76. This causes chain 78, connected to the reciprocator 64 at connection 80, to move back and forth, alternately in the direction 74 and 76.

Chain 78 drivingly engages and is supported by drive sprockets 82 and 84, support sprocket 86, and adjust sprocket 88. As chain 78 is caused to alternately travel in the linear directions 74 and 76 by the to and fro movement of reciprocator 64, drive sprockets 82 and 84 are caused to rotate and to drive coupling shafts 100 and 104, respectively. Drive sprockets 82 will rotate in rotational directions 96 and 98 alternately with the reciprocating movement of reciprocator 64 via chain 78. Likewise, sprocket 84 will rotate in rotational directions 96 and 98 alternately with the reciprocating movement of reciprocator 64 via chain 78.

When chain 78 moves in direction 74, drive sprocket 82 is driven in rotational direction 98, and clutch 108 grippingly rotates shaft 109 in the rotational direction 98, causing like rotation of pulley 115 and the resultant movement of belt 116 in direction 117, as depicted by the arrow indicating motion of the belt 116 in FIG. 3.

When drive sprocket 82 is driven in the opposite rotational direction 96 by the reciprocator 64 driving the chain 78 in the direction 76, clutch 108 releases shaft 109 so that the pulley 115, attached to shaft 109, is free from the influence of drive sprocket 82. Thus it will be understood that the pulley 115 is driven by drive sprocket 82 only when drive sprocket 82 is rotated in rotational direction 98, and is otherwise free from the influence of the action of drive sprocket 82 when drive sprocket 82 rotates in rotational direction 96.

Turning now to drive sprocket 84, when drive sprocket 82 is rotated in rotational direction 98, by the action of the reciprocator 64 driving the chain 78 in the direction 76, clutch 112 grips output shaft 113 and drives output shaft 113 in rotational direction 98. On the other hand, when the chain 78 is moved in the opposite direction 74, drive sprocket 84 is driven in the opposite rotational direction 96, and clutch 112 releases output shaft 113. When rotating in rotational direction 96, drive sprocket 84 has no influence upon output shaft 113. It is clear then that output shaft 113 is driven in angular direction 98 by drive sprocket 84 when drive sprocket 84 is moved in angular direction 98, and when drive sprocket 84 is moved in the opposite angular direction 96, the output shaft 113 is free of the drive sprocket 84.

The result of the operation as above discussed is the continuous rotation of output shaft 115 in the rotational direction 98. When chain 78 is moved in the direction 74, the output shaft 113 is driven by the pulley 116 via pulley 114 in rotational direction 98. When chain 78 is moved in the opposite direction 76, output shaft 113 is driven directly via clutch 112 and coupling shaft 104 is rotated by sprocket 88.

The rotational direction 98 in which output shaft 113 has been described to rotate has been arbitrarily assigned rotational-wise for purposes of illustration and discussion herein. It is clear that this is achieved by the cooperative efforts of the clutch components as above described. It will also be clear that the reversal of the operation of clutches 108 and 112 will result in continuous, unidirectional rotation of output shaft 113 in the opposite rotational direction 96.

Figure 6:
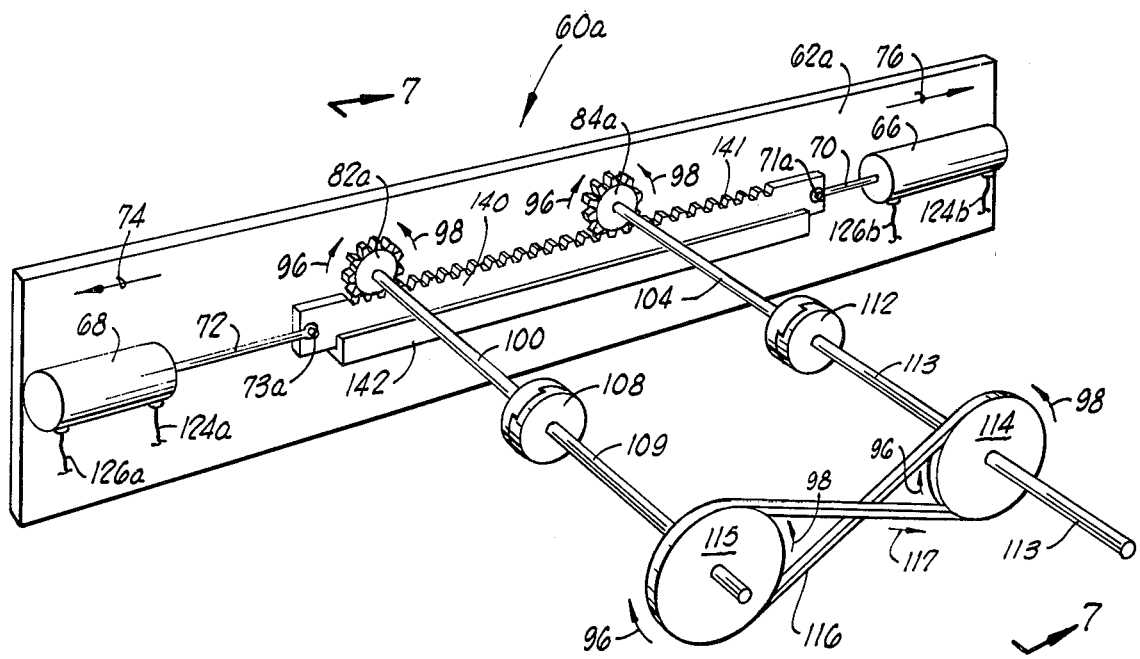
FIG. 6 is a perspective, diagrammatical view of yet another modified reciprocator drive apparatus.
Figure 7:
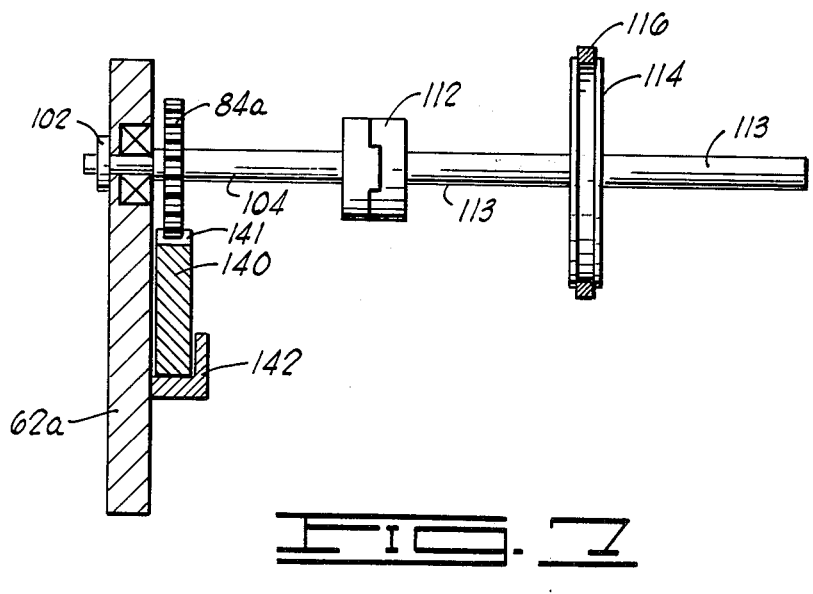
FIG. 7 is a cross-sectional view taken substantially along the lines 7—7 of FIG. 6.

Embodiment of FIGS. 6 and 7

A modification of the embodiment of that shown in FIGS. 2 through 5 is shown in FIG. 6 in schematic form and generally designated by the numeral 60a. This embodiment is very similar to the reciprocator drive apparatus 60 shown in FIG. 2, the differences being the manner of converting the reciprocating movements of piston shafts 70 and 72 to continuous rotation of output shaft 115. Like numerals have been used to denote structure of the embodiment of FIGS. 6 and 7 which is identical to corresponding structure of the embodiment shown in FIGS. 2 through 5.

As shown in FIG. 6, reciprocator 140, a linear member having a rack gear portion 141, is slidingly supported by support member 142, attached to frame 62a. In the same manner as reciprocator 64 in FIG. 2 was caused to reciprocate in directions 74 and 76, it will be seen that reciprocator 140 will be caused to reciprocate in the directions 74 and 76.

Reciprocator 140 is attached at point 71a to piston shaft 70. At the other end of reciprocator 140, piston shaft 72 is attached to reciprocator 140 at point 73a. It will be understood that the structure and operation of hydraulic cylinders 66 and 68 with their respective piston shafts 70 and 72 will be identical to the structure and operation described for the embodiment shown in FIGS. 2 through 5.

Reciprocator 140 gearingly engages drive sprocket 82a and pinion gear 84a. Each of the sprockets 82a, 84a are journally attached to frame 62a, via their respective coupling shafts 100, 104, as can be seen in FIG. 7, in the same manner as were the drive sprockets 82, 84 in the embodiment shown in FIGS. 2 through 5.

Sprocket 82a is attached to coupling shaft 100 which is connected to clutch 108 which in turn is connected to output shaft 109. Sprocket 84a is attached to coupling shaft 104, which is connected to clutch 112, which in turn is connected to output shaft 113. Connected to the output shafts 109, 113 are the pulleys 115 and 114, respectively. Belt 116 drivingly connects pulley 114 to pulley 115 in a cross-connecting manner so that the rotation of output shaft 109 is in a given rotational direction causes rotation of pulley 114 in the rotational direction opposite to that of pulley 115. That is, when pulley 15 turns in rotational direction 96, it will cause pulley 114 to rotate in rotational direction 98. It will be understood that the reversal of the direction of the rotation of pulley 114 to that of pulley 115 could also be achieved by the use of a gear assembly effecting reverse transmission. As was discussed above for the embodiment of FIG. 3, belt slippage must be maintained within reasonable limits by proper belt and sheave selection, or other connecting means should be selected in lieu of the pulleys and belt shown in FIG. 6.

Clutches 108 and 112 are identical in structure as in the embodiment of FIGS. 2 through 5 above. It will then be sufficient at this point to state that coupling shafts 100 and 104 are rotated by sprockets 82a and 84a, respectively, as in the corresponding structure of the embodiment of FIGS. 2 through 5; that is they are driven exactly as are the drive sprockets 82 and 84. The structure of clutches 108 and 112 are conventional, their purpose being to have a gripping direction and a free direction relative to coupling shafts 100 and 104, respectively. Clutch 108 grippingly rotates output shaft 109 in the rotational direction 96 when sprocket 82a is rotated in rotational direction 96 by the driving action of the reciprocator 140 moving in direction 74. On the other hand, when sprocket 82a is driven in the rotational direction 98 by the movement of reciprocator 140 moving in direction 76, the rotation of coupling shaft 100 is not imparted through clutch 108 to output shaft 109, clutch 108 being free turning relative to output shaft 109 while rotating in rotational direction 98. In like manner, clutch 112 grippingly rotates output shaft 113 when sprocket 84a is driven in rotational direction 98 by the action of reciprocator 140 moving in direction 76, and clutch 112 is free turning relative to output shaft 113 when coupling shaft 104 and sprocket 84a are rotated in rotational direction 96 by the action of reciprocator 140 moving in direction 74.

Operation of FIGS. 6 and 7

The operation of the reciprocator drive apparatus 60a will be similar to that as described for reciprocator drive apparatus 60 shown in FIGS. 2 through 5. Hydraulic cylinders 66 and 68 are operated in the same manner as for reciprocator drive apparatus 60, the hydraulic circuitry being identical to that as shown in FIG. 5. Accordingly, piston shafts 70 and 72 are caused to reciprocate in unison by the manipulation of four-way valve 120 in a determined frequency.

Reciprocator 140, attached at points 71a and 73a to piston shaft 70 and 72, respectively, is caused to reciprocate on holder 142. The movement of the reciprocator 140 gearingly drives sprockets 82a and 84a alternately in rotational directions 96 and 98. As reciprocator 140 moves in direction 74, sprocket 82a is caused to rotate in rotational direction 96. This causes coupling shaft 100 to also rotate in rotational direction 96, driving clutch 108 in the same direction. It is in this rotational direction that clutch 108 grippingly rotates output shaft 109, which causes pulley 115 to turn in the rotational direction 96. Pulley 115, turning in rotational direction 96, drives bolt 116 in the direction 117, thereby driving pulley 114 in rotational direction 98. Since pulley 114 is connected to output shaft 113, this rotation of pulley 114 drives output shaft 113, in the rotational direction 98.

As reciprocator 140 moves in the direction 76, it drives sprocket 82a in rotational direction 98. This drives coupling shaft 100 and clutch 108 in the same rotational direction 98. In this rotational direction, clutch 108 is free turning relative to output shaft 109, and does not impart rotation to output shaft 109.

As to the operation of clutch 112, reciprocator 140 is now examined as it moves in direction 76. It is in this direction that sprocket 84a is driven in rotational direction 98, whereby causing the same rotational direction 98 to be imparted to coupling shaft 104 and clutch 112. While turning in rotational direction 98, clutch 112 grippingly rotates shaft 113 in rotational direction 98. On the other hand, the movement of reciprocator 140 in the opposite direction 74 causes sprocket 84a to rotate in rotational direction 96, causing coupling shaft 104 and clutch 112 to also turn in rotational direction 96. While so turning, clutch 112 is free turning relative to output shaft 112, and imparts no movement to output shaft 113.

It is thus seen that the reciprocating movement of reciprocator 140 in alternate directions 74 and 76 is converted via the sprockets 82a, 84a; coupling shafts 100, 104; clutches 108, 112; output shaft 109; pulleys 115, 114; and belt 116, to cause the continuous, unidirectional rotation of output shaft 113 in unidirectional rotational direction 98. It will be understood that rotational direction 98 has been arbitrarily assigned for purposes of illustration in this discussion, and that output shaft 113 can be driven continuously in the opposite rotational direction 96 by reversing the operation of both of the clutches 108 and 112. It is also clear that continuous, unidirectional direction of the output shaft 113 is achieved so long as the reciprocator 140 is in a motion or operational position, and the response of the output shaft 113 is maintained as constant torque throughout the stroke of travel of the reciprocator.

It will be apparent from the foregoing, to those skilled in the art, that the apparatus described in detail above provides an apparatus that will achieve the objects of the present invention, as well as those inherent thereto.

Changes may be made in the construction and the arrangement of the parts or the elements of the various embodiments described herein without departing from the spirit and scope of the invention as defined in the following claims.

What is claimed is:

1. A reciprocator drive apparatus, comprising:
   a frame;
   a reciprocator supported on the frame for movement in a first and a second reciprocating direction in a driven position;
   a first coupling shaft rotatingly supported on the frame;
   a second coupling shaft rotatingly supported on the frame;
   first connecting means drivingly connected to the reciprocator and to the first coupling shaft for rotating the first coupling shaft in a first direction of rotation and in a second direction of rotation, generally opposite the first direction of rotation, in response to the movement of the reciprocator, and, the first connecting means drivingly further connected to the second coupling shaft rotating the second coupling shaft in the first direction of rotation and in the second direction of rotation.

2. The reciprocator drive apparatus of claim 1 wherein the first connecting means includes:
   a support pulley supported by the frame;
   a first pulley connected to the first coupling shaft;
   a second pulley connected to the second coupling shaft; and,
   a belt drivingly connecting the first sprocket, the second sprocket and the support pulley rotating the first and the second coupling shaft in a driven position of the belt, the first and the second coupling shaft driven in opposite directions to each other, the reciprocator being connected to the belt driving the belt in response to movement of the reciprocator.

3. The reciprocator drive apparatus of claim 1 further defined to include:
   power means driving the reciprocator in the first direction and alternately in the second direction.

4. The reciprocator drive apparatus of claim 3 wherein the power means includes:
   a first hydraulic cylinder connected to the reciprocator for driving the reciprocator in the first direction;
   a second hydraulic cylinder connected to the reciprocator for driving the reciprocator in the second direction; and,
   valve means for driving the first hydraulic cylinder and the second hydraulic cylinder cooperatively to drive the reciprocator alternately in the first direction and the second direction.

5. A reciprocator drive apparatus, comprising:
   a frame;
   a reciprocator reciprocatingly supported on the frame for movement in a first and a second reciprocating direction in a driven position;

a first coupling shaft rotatingly supported on the frame;

first connecting means drivingly connected to the reciprocator and to the first coupling shaft rotating the first coupling shaft in a first direction of rotation and in a second direction of rotation, generally opposite the first direction of rotation, in response to movement of the reciprocator;

a first clutch means drivingly connected to the first coupling shaft converting the alternating rotation of the first coupling shaft to a first unidirectional output rotation; and, a first output shaft connected to the first clutch means and unidirectionally rotated in the first unidirectional output direction of rotation by the first coupling shaft via the first clutch means connected between the first coupling shaft and the first output shaft;

a second coupling shaft rotatingly supported on the frame;

a second connecting means drivingly connected to the reciprocator and to the second coupling shaft for rotating the second coupling shaft in the first direction of rotation and in the second direction of rotation, generally opposite the first direction of rotation, in response to movement of the reciprocator;

second clutch means drivingly connected to the second coupling shaft for converting the alternating rotation of the second coupling shaft to a second unidirectional output rotation, generally opposite to the first unidirectional output rotation;

a second output shaft and unidirectionally rotated in the second unidirectional direction of rotation by the second coupling shaft via the second clutch means connected between the second coupling shaft and the second output shaft;

output connecting means connecting the first and the second output shaft rotating the first output shaft in the first unidirectional output direction of rotation in response to rotation of the second output shaft in the second unidirectional output direction of rotation.

6. The reciprocator drive apparatus of claim 5 wherein the reciprocator includes a geared rack portion;

the first connecting means includes a first pulley connected to the first coupling shaft and meshingly engaged with the geared rack portion of the reciprocator; and, the second connecting means includes a second pulley connected to the second coupling shaft and meshingly engaged with the geared rack portion of the reciprocator.

7. The reciprocator drive apparatus of claim 5 wherein the output connecting means is defined further to include:

a first pulley connected to the first output shaft;

a second pulley connected to the second output shaft; and, a belt drivingly connecting the first and the second pulley, the first output shaft rotated in the first unidirectional output direction of rotation in response to the rotation of the second output shaft in the second unidirectional output direction of rotation.

8. The reciprocator drive apparatus of claim 5 further defined to include:

power means driving the reciprocator in the first direction and alternately in the second direction.

9. The reciprocator drive apparatus of claim 8 wherein the power means includes:

a first hydraulic cylinder connected to the reciprocator for driving the reciprocator in the first direction;

a second hydraulic cylinder connected to the reciprocator for driving the reciprocator in the second direction; and valve means for driving the first hydraulic cylinder and the second hydraulic cylinder cooperatively to drive the reciprocator alternately in the first direction and the second direction.

* * * * *

UNITED STATES PATENT OFFICE
CERTIFICATE OF CORRECTION

Patent No. 3,939,719                 Dated February 24, 1976

Inventor(s) William R. Stovall

It is certified that error appears in the above-identified patent and that said Letters Patent are hereby corrected as shown below:

Column 9, line 30 the number "82" should be "84".

Column 10 line 39 the number "15" should be "115".

Signed and Sealed this eighth Day of June 1976

[SEAL]

Attest:

RUTH C. MASON
Attesting Officer

C. MARSHALL DANN
Commissioner of Patents and Trademarks